United States Patent [19]

Teller et al.

[11] 3,891,665

[45] June 24, 1975

[54] α,3-DIPHENYL-2-OXAZOLIDINE-METHANOL COMPOUNDS

[75] Inventors: Daniel M. Teller, Devon; Charles J. Guinosso, Abington; Stanley C. Bell, Penn Valley; George H. Douglas, Paoli, all of Pa.

[73] Assignee: American Home Products Corporation, New York, N.Y.

[22] Filed: Dec. 28, 1973

[21] Appl. No.: 429,223

Related U.S. Application Data

[62] Division of Ser. No. 204,715, Dec. 3, 1971, Pat. No. 3,817,994.

[52] U.S. Cl............................................. 260/307 F
[51] Int. Cl............................................. C07d 85/26
[58] Field of Search............................ 260/307 FA

[56] References Cited
OTHER PUBLICATIONS

Kereszty et al., C.A. 49, 2518h (1955).

*Primary Examiner*—Alton D. Rollins
*Assistant Examiner*—Raymond V. Rush
*Attorney, Agent, or Firm*—Richard K. Jackson

[57] ABSTRACT

2-Aroyloxazolidine 2-aroyltetrahydrooxazines and 2-(α-aralkanol)-oxazolidine derivatives possessing central nervous system depressant activity are prepared by condensing substituted phenyl glyoxals with 1-amino-2 alcohols or 1-amino-3- alcohols to form a ketone and subsequently alkylating the product to the tertiary alcohol.

2 Claims, No Drawings

α,3-DIPHENYL-2-OXAZOLIDINEMETHANOL COMPOUNDS

This is a division of application Ser. No. 204,715, filed Dec. 3, 1971, now U.S. Pat. No. 3,817,994.

BACKGROUND OF THE INVENTION

The condensation reaction of simple aldehydes and ketones with 1-amino-2-alcohols is known to produce oxazolidine derivatives (Bergmann, Chem. Rev., 53, 309–352 (1955). The reaction proceeds according to the equation:

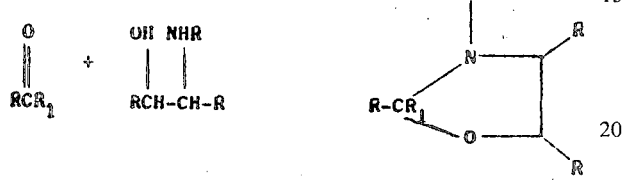

BRIEF DESCRIPTION OF THE INVENTION

This application relates to various oxazolidine derivatives and tetrahydrooxazine derivatives formed by the condensation of a phenylglyoxal derivative with a 1-amino-2-alcohol or a 1-amino-3-alcohol to produce a (2-oxazolidinyl) phenyl ketone or a (2-tetrahydrooxazinyl) phenyl ketone which, upon alkylation, yield a tertiary alcohol of the type 2-oxazolidinyl, α-aralkanol and the 2-tetrahydrooxazinyl, α-aralkanol, respectively.

The condensation of a phenylglyoxal derivative with a 1-amino-2-or 3-alcohol yields a ketone of the structure:

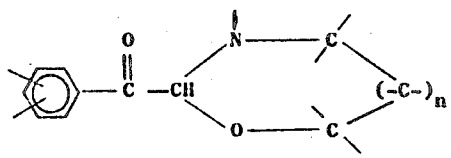

which, when alkylated yields an α-aralkanol of the structure:

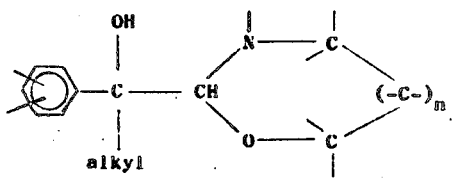

in which $n$ is one of the integers 0 and 1.

The compounds of this invention are biologically active in that they are central nervous system depressants. In addition to the central nervous system depressant activity of the compounds in general, certain specific compounds exhibit anti-inflammatory activity and/or inhibition of blood platelet aggregation or adhesiveness.

DETAILED DESCRIPTION OF THE INVENTION

In accordance with this invention there is provided a group of chemical compounds characterized by the structural formula:

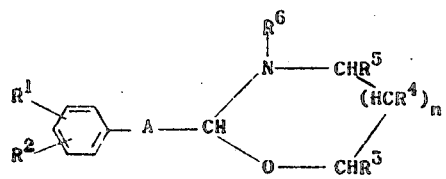

in which $R^1$ is a member of the group consisting of —H, —Cl, —CH$_3$, —OCH$_3$, and

$R^2$ is a member of the group consisting of —H and —Cl;

$R^3$ is a member of the group consisting of —H and phenyl;

$R^4$ is a member of the group consisting of —H and lower alkyl;

$R^5$ if a member of the group consisting of —H and lower alkyl;

$R^6$ is a member of the group consisting of —lower alkyl of 1 to 6 carbon atoms, aryl 6–10 carbon atoms, aralkyl of 7–10 carbon atoms and arylsulfonyl of 6–10 carbon atoms;

$n$ is one of the integers and 0 and 1; and

A is a member of the group consisting of

The ketones of this invention are prepared by the reaction of a compound of the formula:

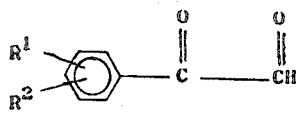

with a reactant of the formula:

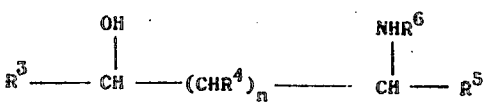

in which the groups $R^1$–$R^6$ and $n$ are defined above, at a temperature between from about room temperature to about 85°C. in an inert solvent system for a time from about 10 minutes to about 3 hours. The reaction rate may be increased by use of a strong acid catalyst such as p-toluenesulfonic acid if desired.

The tertiary alcohols of this invention are prepared by the reaction of the ketones prepared by the method outlined in the preceding paragraph having the structural formula:

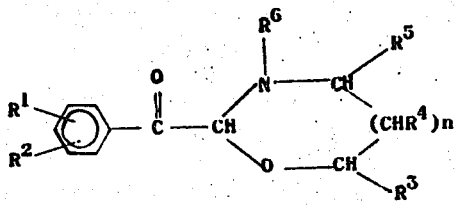

with an alkylating agent such as the Grignard reagents, methyl magnesium bromide and butyl magnesium bromide.

The compounds in which A is the carbonyl group are preferred over the corresponding tertiary alcohol for economic reasons in that they are prepared in fewer steps requiring less supervision of manufacturing personnel and equipment. However, the tertiary alcohol derivatives provide a unique functional group which may be readily utilized to tailor the compounds for special applications without any appreciable loss of activity.

The compounds of this invention are central nervous system depressants. As such, they are administered orally or intraperitoneally as the amine or in the form of pharmaceutically acceptable salts, with or without a physiologically acceptable carrier. The addition salts may be prepared by known techniques and include the hydrochloride, hydrobromide, sulfate, nitrate and phosphate salts.

The depressant activity of the compounds disclosed and claimed herein was established by the oral and intraperitoneal administration to three mice weighing from 14 to 24 grams at each of the dosage levels 400, 127, 40, 12.7, 4.0 and 1.27 milligrams per kilogram body weight. The mice were then observed for at least 2 hours during which time, signs of general stimulation (i.e. increased spontaneous motor activity, hyperactivity on tactile stimulation, etc.), general depression (i.e. decreased motor activity, decreased respiration, etc.) and autonomic activity (i.e. ptosis, mydriasis, etc.) were noted. Each of the claimed compounds were active in the dosage range at or below about 127 milligrams per kilogram body weight, to about 1.27 milligrams per kilogram. Within the range of activity, each of the compounds of this invention induced depressant activity evidenced by decreased motor activity and respiration.

In addition to the activity of the compounds as central nervous system depressants, certain members of the compound genus disclosed herein inhibit blood platelet aggregation or adhesiveness. As such, those compounds are useful anti-thrombotic agents for the inhibition of the arteriosclerotic process which begins in a thrombus formation via blood platelet aggregation or clotting.

The compounds which have been found to possess CNS depressant activity and the ability to prevent blood platelet aggregation are those of the formula:

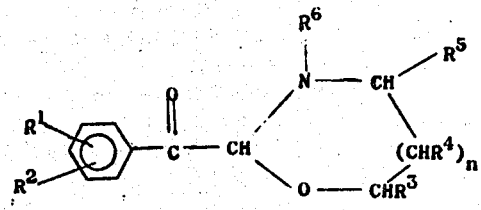

in which
  $R^1$ is selected from the group consisting of the —H, —Cl and —OCH$_3$;
  $R^2$ is selected from the group consisting of —H and —Cl;
  $R^3$ is selected from the group consisting of —H and phenyl;
  $R^4$ is hydrogen;
  $R^5$ is selected from the group consisting of —H and —CH$_3$;
  $R^6$ is selected from the group consisting of —CH$_3$, phenyl, phenethyl, p-tolylsulfonyl; and
  n is one of the integers 0 and 1.

Both in vitro and in vivo activity as inhibitors of blood platelet aggregation was evaluated. The in vitro studies were made on platelet rich plasma obtained from normal fasted male rats. Adenosine diphosphate was added to the platelet rich plasma in an amount predetermined to maximize platelet aggregation. A curve of per cent light transmission at 610 millimicrons was plotted for a seven minute period. The compounds being tested are incorporated in identical formulations and the concentration effecting a 50 percent inhibition of the adenosine diphosphate activity was determined by comparison with the standard curve. The compounds of this invention inhibited blood platelet aggregation at concentrations as low as about 0.03 millimolar while increased activity occurred with increased concentration.

The in vivo testing of the anti-thrombotic compounds was performed on male rats administered with adenosine diphosphate. The compounds of this invention generally demonstrated significant inhibition in dosages as low as 50 milligrams per kilogram body weight. The compound of Example 8, infra, was exceptional in that it exhibited marked activity at a concentration as low as 25 milligrams per kilogram body weight when orally administered and slight activity at 20 milligrams per kilogram body weight.

In addition to central nervous system depressant activity and its anti-thrombotic function, the compound (3,4-dimethyl-5-phenyl-2-oxazolidinyl) p-methoxyphenyl ketone is a very effective anti-inflammatory agent. Furthermore, the alcohol, α-methyl-α, 3-diphenyl-2-oxazolidinemethanol, exhibits central nervous system depressant activity and acts as an anti-inflammatory agent as well. Likewise, the compound (3-benzyltetrahydro-2H-1, 3-oxazin-2-yl) (p-chlorophenyl) ketone is a central nervous system depressant, inhibits blood platelet aggregation and serves as an anti-inflammatory agent.

The anti-inflammatory activity of the compounds possessing that activity was illustrated by acceleration of the reaction of albumin (serum albumin, Fraction V) with 5,5'-dithiobis-2-nitrobenzoic acid to produce 5-thio-2-nitrobenzoic acid in the presence of the novel anti-inflammatory agents when compared to the reaction rate in the absence of the agents. In detail, solutions were prepared by dissolving 3 milliliters of 4.1 percent serum albumin (Fraction V), 0.2 milliliters of 2 millimolar 5,5'-dithiobis-2-nitrobenzoic acid and varying concentrations of the compound being tested (3,4-dimethyl-5-phenyl-2-oxazolidinyl) p-methoxyphenyl ketone, (α-methyl-α,3-diphenyl-2-oxazolidinyl-methanol), and (3-benzyltetrahydro-2H-

1,3-oxazin-2-yl)(p-chlorophenyl) ketone in 3 milliliter samples containing 0.1 molar potassium phosphate buffer to obtain a pH of 7.4. Tests in the range from 1.0 millimolar to a minimum of 0.3 millimolar concentration of test compound were studied by incubation of the 3 milliliter samples at 30°C. while colorimetrically (absorbance at 412 millimicrons) following the reaction rate at 10 minute intervals for 40 minutes. The test results obtained demonstrated that the compounds were effective inhibitors.

The indicated in vitro anti-inflammatory activity was confirmed by in vivo studies in which over 40 percent inhibition of experimentally induced edema in the hind paw of male rats weighing from 120–160 grams was observed. In practice, from 1.0 to 100 milligrams of the compound being tested per kilogram body weight of the rat was administered orally to six rats with a six rat control being administered aqueous vehicle with no active compound. Sixty minutes after drug administration, edema was induced by injection of 0.05 milliliters of 1 percent carrageenin solution in saline into the subplantar tissue of the rat's right hind paw. The paw volume was immediately volumetrically determined with a plethysmograph and again 3 hours later. The mean volume swelling for the control group was determined and compared to the test group. Swelling inhibition of 23 percent or more is considered to be indicative of an active compound. The alcohol $\alpha$-methyl-$\alpha$-,3-diphenyl-2-oxazolidine-methanol exhibited at 43 percent inhibition while the ketone, (3,4-dimethyl-5-phenyl-2-oxazolidinyl) p-methoxyphenyl ketone inhibited inflammation by 46 percent and (3-benzyltetrahydro-2H-1,3-oxazin-2-yl)(p-chlorophenyl) ketone was similarly active.

The following preparative procedures for producing the compounds of this invention are presented for purpose of illustration and are not to be construed as the limiting factors on the proper scope of the disclosed invention. It is recognized that those of average skill in the art, when apprized of the invention herein disclosed will contemplate and be placed in possession of applicants' contribution to the extent of its true scope.

In the Examples, all temperatures are in degrees Centigrade; all infra-red analysis is expressed in microns ($\mu$) whereas the ultra-violet maxima is expressed in millimicrons (m$\mu$); the nuclear magnetic resonance (NMR) data is presented as parts per million (ppm); TLC represents thin layer chromotgraphy; and ($d$) means decomposes.

EXAMPLE 1

(p-Chlorophenyl) (3-methyl-2-oxazolidinyl) ketone

A solution of p-chlorophenylglyoxal, hydrate (10.0 g., 0.054 mole), N-methylethanolamine (4.44 g., 0.059 mole), and p-toluenesulfonic acid monohydrate (0.10 g.) in benzene (400 ml.) is refluxed for 2 hours using a Dean-Stark receiver to remove water. After cooling to room temperature the mixture is washed with saturated aqueous sodium bicarbonate, brine, dried over anhydrous sodium sulfate and stripped in vacuo. The gummy residue is crystallized from hexane and then from isopropanol giving 4.50 g. of yellow solid; m.p. 63°–67°; $\lambda_{max}^{KBr}$ 5.90 $\mu$; $\lambda_{max}^{EtOH}$ 255 m$\mu$ ($\epsilon$ 14,700); NMR has methyl singlet at 2.53 ppm, triplet centered at 4.00 ppm and singlet at 5.12 ppm.

Calcd. for $C_{11}H_{12}ClNO_2$: C, 58.54; H, 5.36; N, 6.27; Cl. 15.71.

Found: C, 58.68; H, 5.58; N, 6.28; Cl, 15.41.

EXAMPLE 2

(3-Methyl-2-oxazolidinyl)phenyl Ketone

Using the conditions described in Example 1, to substituting phenylglyoxal, hydrate for p-chlorophenylglyoxal, hydrate gives the title compound; b.p. 112°/0.2 mm; $\lambda_{max}^{KBr}$ 5.88; $\lambda_{max}^{EtOH}$ 245 m$\mu$ ($\epsilon$ 5,750); NMR has methyl singlet at 2.37 ppm and singlet at 4.98 ppm.

Calcd. for $C_{11}H_{13}NO_2$: C, 69.17; H, 6.81; N, 7.33.
Found: C, 69.22; H, 7.08; N, 7.68.

EXAMPLE 3

(p-Chlorophenyl)(3,4-dimethyl-5-phenyl-2-oxazolidinyl) ketone

Using the conditions described in Example 1, but substituting 1-ephedrine for N-methylethanolamine gives the title compound m.p. 85°–89°; $\lambda_{max}^{KBr}$ 5.90 $\mu$; $\lambda_{max}^{EtCH}$ 256 m$\mu$ ($\epsilon$ 15,300); NMR has methyl doublet centered at 0.69 ppm, methyl singlet at 2.45 ppm and singlet at 4.81 ppm.

Calcd. for $C_{18}H_{18}ClNO_2$: C, 68.50: H, 5.70; N, 4.44; Cl, 11.24.
Found: C, 68.60; H, 5.76; N, 4.72; Cl, 11.44.

EXAMPLE 4

(p-Chlorophenyl)(3,4-dimethyl-5-phenyl-2-oxazolidinyl) ketone

Using the conditions described in Example 1, but substituting d-pseudoephedrine for N-methylethanolamine gives the title compound m.p. 61°–63°; $\lambda_{max}^{KBr}$ 5.97 $\mu$; $\lambda_{max}^{EtOH}$ 2.56 m$\mu$ ($\epsilon$ 13,800); NMR has methyl doublet centered at 1.25 ppm, methyl singlet at 2.38 ppm and singlet at 4.87 ppm.

Calcd for $C_{18}H_{18}ClNO_2$: C, 68.51; H, 5.70; N, 4.44; Cl, 11.24.
Found: C, 68.53; H, 5.85; N, 4.42; Cl, 10.90.

EXAMPLE 5

Phenyl (3-phenyl-2-oxazolidinyl)ketone

Using the conditions described in Example 1 but substituting phenylglyoxal, hydrate for p-chlorophenylglyoxal, hydrate and N-phenylethanolamine for N-methylethanolamine gives the title compound; m.p. 131°–133°; $\lambda_{max}^{KBr}$ 5.94 $\mu$; $\lambda_{max}^{EtOH}$ 2.46 m$\mu$ ($\epsilon$ 26,200); NMR has singlet at 6.05 ppm.

Calcd for $C_{16}H_{15}NO_2$: C, 75.87; H, 5.97; N, 5.53.
Found: C, 75.92; H, 6.22; N, 5.51.

EXAMPLE 6

(3,4-Dimethyl-5-phenyl-2-oxazolidinyl)phenylketone

Using the conditions described in Example 1 but substituting 1-ephedrine for N-methylethanolamine and phenylglyoxal, hydrate for p-chlorophenylgloyoxal, hydrate gives the title compound; m.p. 84°–88°, $\lambda_{max}^{KBr}$ 5.88 $\mu$; $\lambda_{max}^{EtOH}$ 247 m$\mu$ ($\epsilon$ 11,700); NMR has methyl singlet at 2.41 ppm and singlet at 4.90 ppm.

Calcd for $C_{18}H_{19}NO_2$: C, 76.84; H, 6.81; N, 4.98.
Found: C, 76.96; H, 7.03; N, 5.24.

EXAMPLE 7

(3,4-Dimethyl-5-phenyl-2-oxazolidinyl)(p-tolyl)ketone

Using the conditions described in Example 1, but substituting p-tolylglyoxal, hydrate for p-chlorophenylglyoxal, hydrate and 1-ephedrine for N-methylethanolamine gives the title compound; m.p. 92°–95°; $\lambda_{max}^{KBr}$ 5.92 $\mu$; $\lambda_{max}^{EtOH}$ 257 m$\mu$ ($\epsilon$ 15,400; NMR has methyl singlet at 2.36 ppm and singlet at 4.82 ppm.

Calcd for $C_{19}H_{21}NO_2$: C, 77.26; H, 7.17; N, 4.74.
Found: C, 77.53; H, 7.56; N, 4.69.

EXAMPLE 8

(p-Anisoyl)(3,4-dimethyl-5-phenyl-2-oxazolidinyl)ketone

A solution of 10.0 g. of p-methoxyphenyl glyoxal (0.055 moles), 9.60 g. of 1-ephedrine hemihydrate (0.055 moles) and 100 mg. of p-toluenesulfonic acid in 50 ml. of benzene was refluxed for 2 hours using a Dean-Stark receiver to remove water. The solution was cooled to room temperature, washed with aqueous sodium bicarbonate, brine dried over anhydrous sodium sulfate and stripped in vacuo. Crystallization of the residue from isopropanol gave 8.70 g. of colorless solid, m.p. 89°–93°C, homogeneous on TLC; $\lambda_{max}^{KBr}$ 5.92 $\mu$; $\lambda_{max}^{EtOH}$ 283 m$\mu$ ($\epsilon$ 16,400); NMR displayed a methyl singlet at 2.39 ppm, methoxyl singlet at 3.78 ppm and a single at 4.87 ppm.

Calcd for $C_{19}H_{21}NO_3$: C, 73.29; H, 6.80; N, 4.50.
Found: C, 73.21; H, 6.72; N, 4.47.

EXAMPLE 9

(p-Anisoyl)(3,4-dimethyl-5-phenyl-2-oxazolidinyl)ketone

Using the conditions described in Example 1, but substituting p-anisoylglyoxal, hydrate for p-chlorophenylglyoxal, hydrate and d-pseudoephedrine for N-methylethanolamine gives the title compound; m.p. 68°–72°; $\lambda_{max}^{KBr}$ 5.98 $\mu$; $\lambda_{max}^{EtOH}$ 283 m$\mu$ ($\epsilon$ 16,100); NMR has methyl singlet at 2.37 ppm, methoxyl singlet at 3.80 ppm and singlet at 4.88 ppm.

Calcd for $C_{19}H_{21}NO_3$: C, 73.29: H, 6.80; N, 4.50.
Found: C, 73.53; H, 7.05; N, 4.58.

EXAMPLE 10

(2,6-Dichlorophenyl)(3,4-dimethyl-5-phenyl-2-oxazolidinyl)ketone, hydrochloride, ethanolate Using the conditions described in Example 1, but substituting 2,6-dichlorophenylglyoxal, hydrate for p-chlorophenylglyoxal, hydrate and 1-ephedrine for N-methylethanolamine followed by treatment with ethanolic hydrogen chloride in ether gives the title compound; m.p. 128°–132° (d); $\lambda_{max}^{KBr}$ 5.78 $\mu$; NMR has methyl singlet at 2.97 ppm and singlet at 5.60 ppm.

Calcd for $C_{18}H_{18}Cl_3NO_2 \cdot 1.1\ C_2H_5OH$: C, 55.35: H, 5.67; N, 3.23; Cl, 24.32.
Found: C, 55.45; H, 5.65; N, 3.77; Cl, 23.60.

EXAMPLE 11

2-Benzoyl-3-(p-tolylsulfonyl) oxazolidine

A solution of phenylglyoxal, hydrate (5.0 g., 0.033 moles), N-tolylsulfonamidoethanolamine (7.8 g., 0.036 moles), and p-toluenesulfonic acid monohydrate in benzene (200 ml.) is refluxed for 1.5 hours using a Dean-Stark receiver to remove water. After cooling to room temperature the mixture is washed with 5% aqueous sodium hydroxide, saturated aqueous sodium bicarbonate, brine dried over anhydrous sodium sulfate and stripped in vacuo. The gummy residue is columned on Florex using 100% benzene as eluant to give 0.85 g. of colorless solid after recrystallization from methanol; m.p. 108°–110°; $\lambda_{max}^{KBr}$ 5.89, 7.39, 8.59 $\mu$; $\lambda_{max}^{EtOH}$ 240 m$\mu$ ($\epsilon$ 16,400); NMR 1 proton singlet at 6.57 ppm.

Calcd for $C_{17}H_{17}NSO_4$: C, 61.63; H, 5.17; N, 4.23; S, 9.67.
Found: C, 61.67; H, 5.32; N, 4.08; S, 10.08.

EXAMPLE 12

α-Methyl-α-3-diphenyl-2-oxazolidinemethanol

To a slurry of phenyl (3-phenyl-2-oxozolidinyl)ketone (10.0 g., 0.04 mole) in ether (1,000 ml) under nitrogen is added at room temperature over 10 minutes a solution of methyl magnesium bromide (70 ml of 3 M solution in ether) in ether (500 ml). The mixture is refluxed for 2.5 hours, poured onto ice, and the layers separated. The aqueous layer is extracted with ether and the extracts combined with the organic layer. The organic layer is washed with saturated aqueous sodium bicarbonate, brine, dried over anhydrous sodium sulfate and stripped in vacuo. The residue is crystallized from hexane giving 6.80 g. of colorless solid, m.p. 80°–82°; $\lambda_{max}^{KBr}$ 2.92 $\mu$ and no carbonyl absorption, $\lambda_{max}^{EtOH}$ 246 m$\mu$ (11,400); NMR has methyl singlet at 1.64 ppm.

Anal. Calcd for $C_{17}H_{19}NO_2$: C, 75.81; H, 7.11; N, 5.20.
Found: C, 75.89; H, 7.28; N, 5.11.

EXAMPLE 13

(3-Benzyltetrahydro-2H-1,3-oxazin-2-yl)(p-chlorophenyl) ketone

Following the procedure of Example 1, with the exception that 3-benzylaminopropan-1-ol was substituted for N-methylethanolamine, afforded the title compound; m.p. 55°–59°C; $\lambda_{max}^{KBr}$ 5.88 $\mu$; $\lambda_{max}^{EtOH}$ 257 m$\mu$ (14,100); NMR singlet at 5.20 ppm.

Elemental Analysis: $C_{18}H_{18}ClNO_2$
Calculated: C, 68.46; H, 5.74; N, 4.43; Cl, 11.25.
Found: C, 68.03; H, 5.49; N, 4.86; Cl, 11.50.

What is claimed is:

1. A compound of the formula

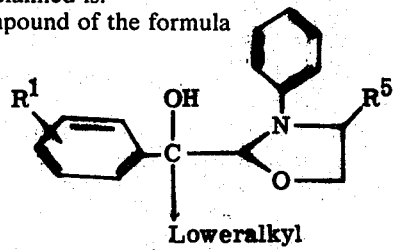

in which

R$^1$ is a member of the group consisting of —H and —CH$_3$;

R$^5$ is a member of the group consisting of —H and lower alkyl.

2. The compound of claim 1 which is α-methyl-α, 3-diphenyl-2-oxazolidinemethanol.

* * * * *